US011961007B2

United States Patent
Verrilli et al.

(10) Patent No.: US 11,961,007 B2
(45) Date of Patent: Apr. 16, 2024

(54) SPLIT NETWORK ACCELERATION ARCHITECTURE

(71) Applicant: QUALCOMM Incorporated, San Diego, CA (US)

(72) Inventors: Colin Beaton Verrilli, Apex, NC (US); Rashid Ahmed Akbar Attar, San Diego, CA (US); Raghavendar Bhavansikar, Erie, CO (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 16/783,047

(22) Filed: Feb. 5, 2020

(65) Prior Publication Data

US 2020/0250545 A1    Aug. 6, 2020

Related U.S. Application Data

(60) Provisional application No. 62/802,150, filed on Feb. 6, 2019.

(51) Int. Cl.
*G06N 3/10* (2006.01)
*G06N 3/044* (2023.01)
(Continued)

(52) U.S. Cl.
CPC ............... *G06N 3/10* (2013.01); *G06N 3/045* (2023.01); *G06N 3/08* (2013.01); *G06N 5/04* (2013.01); *G06N 3/044* (2023.01); *G06N 3/063* (2013.01)

(58) Field of Classification Search
CPC ...... G06N 3/0445; G06N 3/0454; G06N 3/06; G06N 3/08; G06N 3/10; G06N 20/00;
(Continued)

(56) References Cited

U.S. PATENT DOCUMENTS

| | | | |
|---|---|---|---|
| 2010/0076915 A1 | 3/2010 | Xu et al. | |
| 2015/0371132 A1* | 12/2015 | Gemello | H01L 29/785 706/20 |

(Continued)

FOREIGN PATENT DOCUMENTS

| | | |
|---|---|---|
| CN | 106776461 A | 5/2017 |
| CN | 108470009 A | 8/2018 |

(Continued)

OTHER PUBLICATIONS

Huang et al. ("Gpipe: Efficient Training of Giant Neural Networks using Pipeline Parallelism", https://arxiv.org/pdf/1811.06965v1.pdf, arXiv:1811.06965v1 [cs.CV] Nov. 16, 2018, pp. 1-11) (Year: 2018).*

(Continued)

*Primary Examiner* — Shane D Woolwine
(74) *Attorney, Agent, or Firm* — QUALCOMM Incorporated

(57) ABSTRACT

A method for accelerating machine learning on a computing device is described. The method includes hosting a neural network in a first inference accelerator and a second inference accelerator. The neural network split between the first inference accelerator and the second inference accelerator. The method also includes routing intermediate inference request results directly between the first inference accelerator and the second inference accelerator. The method further includes generating a final inference request result from the intermediate inference request results.

20 Claims, 8 Drawing Sheets

(51) Int. Cl.
*G06N 3/045* (2023.01)
*G06N 3/063* (2023.01)
*G06N 3/08* (2023.01)
*G06N 5/04* (2023.01)

(58) Field of Classification Search
CPC .......... G06N 20/10; G06N 20/20; G06N 3/02; G06N 3/04; G06N 3/044; G06N 3/045; G06N 3/0495; G06N 3/063; G06N 5/04
See application file for complete search history.

(56) References Cited

U.S. PATENT DOCUMENTS

| | | | |
|---|---|---|---|
| 2018/0121786 A1 | 5/2018 | Narayanaswami et al. | |
| 2018/0181503 A1* | 6/2018 | Nicol | G06F 13/1689 |
| 2018/0307981 A1 | 10/2018 | Cilingir et al. | |
| 2019/0286974 A1* | 9/2019 | Li | G06N 3/04 |
| 2020/0174840 A1* | 6/2020 | Zhao | G06N 3/084 |

FOREIGN PATENT DOCUMENTS

| | | |
|---|---|---|
| CN | 108734286 A | 11/2018 |
| CN | 108734649 A | 11/2018 |
| CN | 109272035 A | 1/2019 |

OTHER PUBLICATIONS

Gao et al. (HRL: Efficient and Flexible Reconfigurable Logic for Near-Data Processing, 2016 IEEE International Symposium on High Performance Computer Architecture (HPCA), 2016, pp. 126-137) (Year: 2016).*

Kwon et al. ("Beyond the memory wall: A case for memory-centric hpc system for deep learning." 2018 51st Annual IEEE/ACM International Symposium on Microarchitecture (Micro). IEEE, 2018, pp. 148-161) (Year: 2018).*

Lan et al. ("A Bidirectional NoC (BiNoC) Architecture with Dynamic self-Reconfigurable Channel", IEEE Transactions on Computer-Aided Design of Integrated Circuits and Systems, vol. 30, No. 3, Mar. 2011, pp. 427-440) (Year: 2011).*

Alex Krizhevsky ("One weird trick for parallelizing convolutional neural networks", https://arxiv.org/abs/1404.5997, arXiv: 1404.5997v2 [cs.NE] Apr. 26, 2014, pp. 1-7) (Year: 2014).*

International Search Report and Written Opinion—PCT/US2020/017030—ISAEPO—dated Jun. 4, 2020.

Taiwan Search Report—TW109103766—TIPO—dated May 24, 2023.

* cited by examiner

SPLIT NETWORK ACCELERATION ARCHITECTURE

CROSS-REFERENCE TO RELATED APPLICATION

The present application claims the benefit of U.S. Provisional Patent Application No. 62/802,150, filed Feb. 6, 2019, and titled "SPLIT NETWORK ACCELERATING ARCHITECTURE," the disclosure of which is expressly incorporated by reference herein in its entirety.

TECHNICAL FIELD

Certain aspects of the present disclosure generally relate to artificial neural networks and, more particularly, to hardware accelerators for split artificial neural networks.

BACKGROUND

An artificial neural network, which may include an interconnected group of artificial neurons, may be a computational device or may represent a method to be performed by a computational device. Artificial neural networks may have corresponding structure and/or function in biological neural networks. Artificial neural networks, however, may provide useful computational techniques for certain applications, in which traditional computational techniques may be cumbersome, impractical, or inadequate. Because artificial neural networks may infer a function from observations, such networks may be useful in applications where the complexity of the task and/or data makes the design of the function burdensome using conventional techniques.

In computing, hardware acceleration is the use of computer hardware to perform some functions more efficiently than is possible in software running on a more general-purpose central processing unit (CPU). The hardware that performs the acceleration may be referred to as a hardware accelerator. Hardware accelerators may improve the execution of a specific algorithm by allowing greater concurrency, having specific data-paths for temporary variables in the algorithm, and possibly reducing the overhead of instruction control.

SUMMARY

A method for accelerating machine learning on a computing device is described. The method includes hosting a neural network in a first inference accelerator and a second inference accelerator. The neural network split between the first inference accelerator and the second inference accelerator. The method also includes routing intermediate inference request results directly between the first inference accelerator and the second inference accelerator. The method further includes generating a final inference request result from the intermediate inference request results.

A system for accelerating machine learning is described. The system includes a neural network hosted in a first inference accelerator and a second inference accelerator. The neural network split between the first inference accelerator and the second inference accelerator. The system also includes a switch to route intermediate inference request results directly between the first inference accelerator and the second inference accelerator. The system further includes a host device to receive a final inference request result generated from the intermediate inference request results.

A system for accelerating machine learning is described. The system includes a neural network hosted in a first inference accelerator and a second inference accelerator. The neural network split between the first inference accelerator and the second inference accelerator. The system also includes means for routing intermediate inference request results directly between the first inference accelerator and the second inference accelerator. The system further includes a host device to receive a final inference request result generated from the intermediate inference request results.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
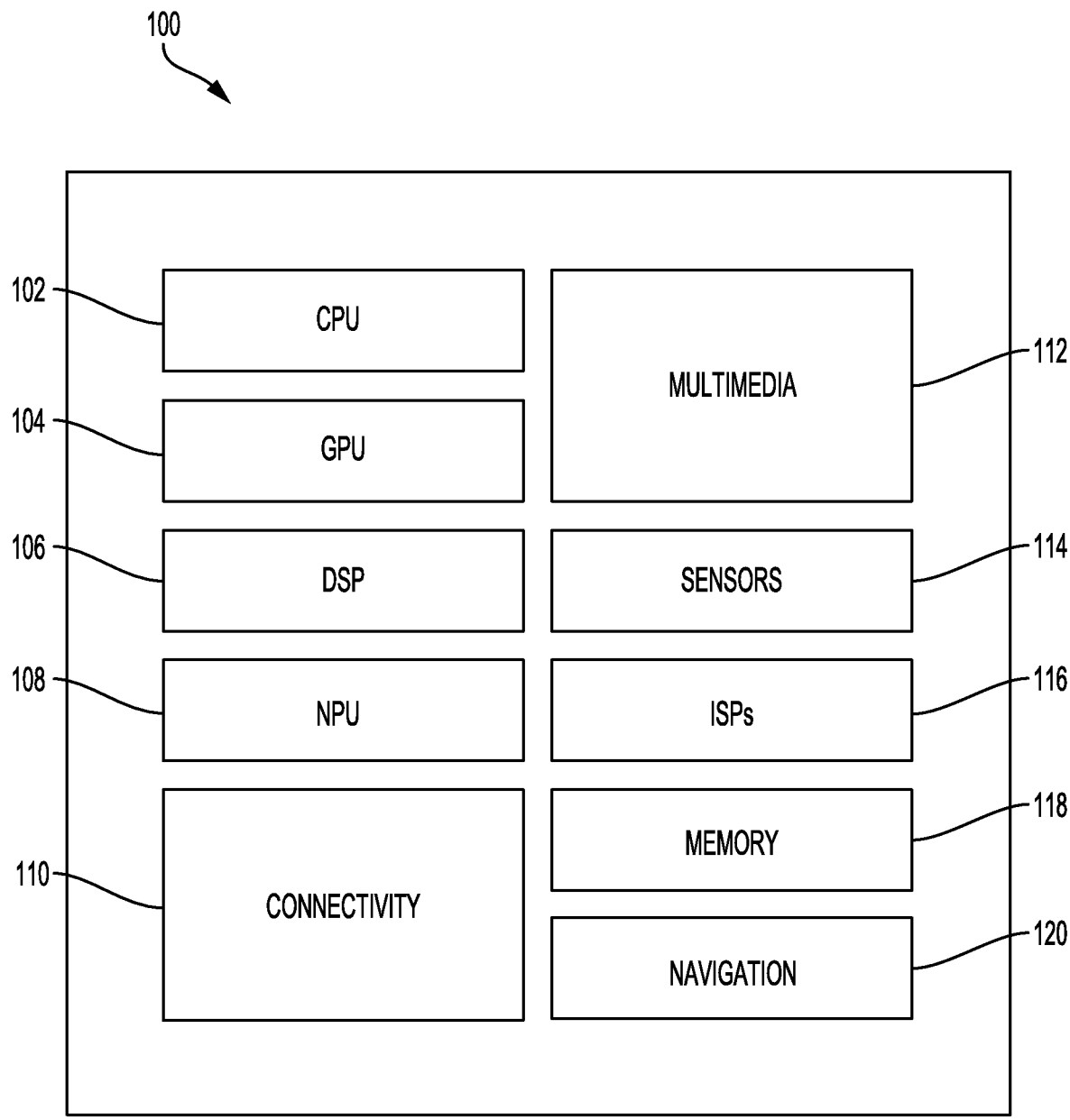
FIG. 1 illustrates an example implementation of designing a neural network using a system-on-chip (SoC), including a general-purpose processor, in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

An example of accelerated deep learning uses a deep learning accelerator (e.g., an artificial intelligence inference accelerator) to train a neural network. Another example of accelerated deep learning uses a deep learning accelerator to operate a trained neural network to perform inferences. Yet another example of accelerated deep learning is using a deep learning accelerator to train a neural network and, subsequently, perform an inference with the trained neural network. The inference is also performed with information from the trained neural network and/or a variant of the trained neural network.

As noted, an artificial intelligence accelerator may be used to train a neural network. Training of a neural network generally involves determining one or more weights associated with the neural network. For example, the weights associated with a neural network are determined by hardware acceleration using a deep learning accelerator. Once the weights associated with a neural network are determined, an inference may be performed using the trained neural network, which computes results (e.g., activations) by processing input data based on the weights associated with the trained neural network.

In practice, however, a deep learning accelerator has a fixed amount of memory (e.g., static random access memory (SRAM) with a capacity of 128 megabytes (MB)). As a result, the capacity of a deep learning accelerator is sometimes not large enough to accommodate and store a single network. For example, some networks have weights of a larger size than the fixed amount of memory available from the deep learning accelerator. One solution to accommodate large networks is to split the weights into a separate storage device (e.g., a dynamic random access memory (DRAM)). These weights are then read from the DRAM during each inference. This implementation, however, uses more power and can result a memory bottleneck.

Another solution to accommodate large networks is splitting the network into multiple pieces and passing intermediate results from one accelerator to another through a host. Unfortunately, passing intermediate inference request results through the host consumes host bandwidth. For example, using a host interface (e.g., a peripheral component interconnect express (PCIe) interface) to pass intermediate inference request results consumes the host memory bandwidth. In addition, passing intermediate inference request results through the host (e.g., a host processor) consumes central processing unit cycles of the host processor and adds latency to an overall inference calculation.

One aspect of the present disclosure splits a large neural network into multiple, separate artificial intelligence (AI) inference accelerators (AIIAs). Each of the separate AI inference accelerators may be implemented in a separate system-on-chip (SoC). For example, each AI inference accelerator is allocated and stores a fraction of the weights or other parameters of the neural network. Intermediate inference request results are passed from one AI inference accelerator to another AI inference accelerator independent of a host processor. Thus, the host processor is not involved with the transfer of the intermediate inference request results.

In some aspects, a designated AI inference accelerator of the AI inference accelerators directly communicates with the host (e.g., host processor). For example, a non-designated AI inference accelerator communicates with the host processor through the designated AI inference accelerator. The separate AI inference accelerators are also coupled to a peripheral interface or a server. The separate AI inference accelerators may be implemented in a same or different module (or card) or in a same or different package.

In one aspect, a switch device (e.g., a peripheral component interconnect express (PCIe) switch or other like peripheral interconnect switch) is coupled to the separate AI inference accelerators to transfer the intermediate inference request results between the separate AI inference accelerators without involving the host processor. Thus, each of the separate artificial intelligence inference accelerators collectively perform an inference for a neural network that is split between separate artificial intelligence inference accelerators.

FIG. 1 illustrates an example implementation of a system-on-chip (SoC) 100, which may include a central processing unit (CPU) 102 or multi-core CPUs, in accordance with certain aspects of the present disclosure, such as split network acceleration. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a connectivity block 110, which may include fifth generation (5G) connectivity, fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114, image signal processors (ISPs) 116, and/or navigation module 120, which may include a global positioning system.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
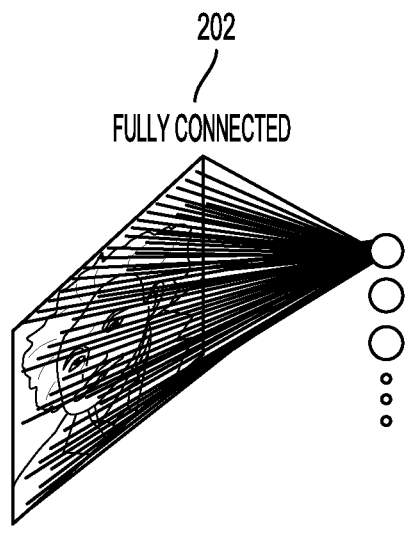
FIGS. 2A, 2B, and 2C are diagrams illustrating a neural network, in accordance with aspects of the present disclosure.
Figure 2B:
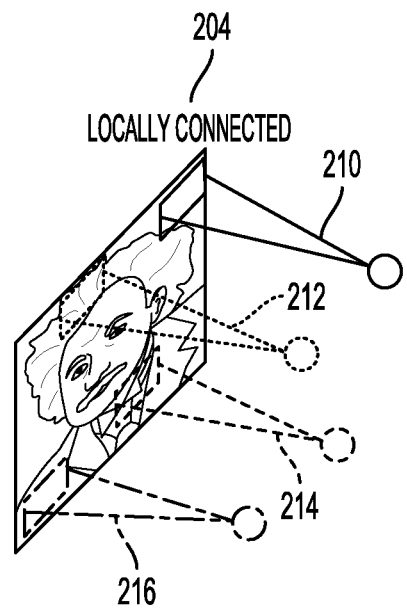

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connection strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
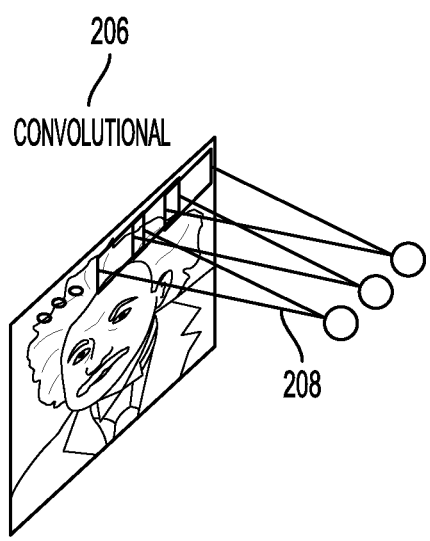

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
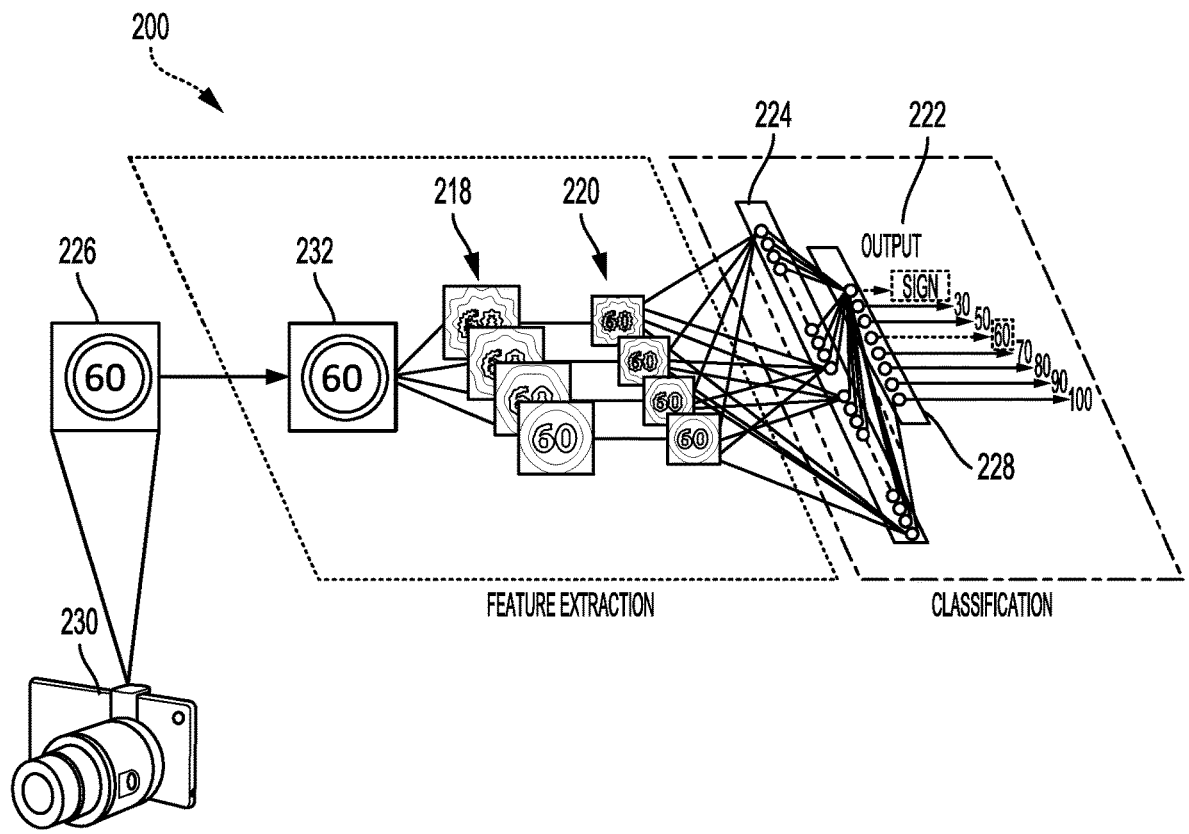
FIG. 2D is a diagram illustrating a neural network, in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different convolutional kernels were applied to the image 226 at the convolutional layer 232, four different feature maps are generated in the first set of feature maps 218. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224.

Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100." Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

Figure 3:
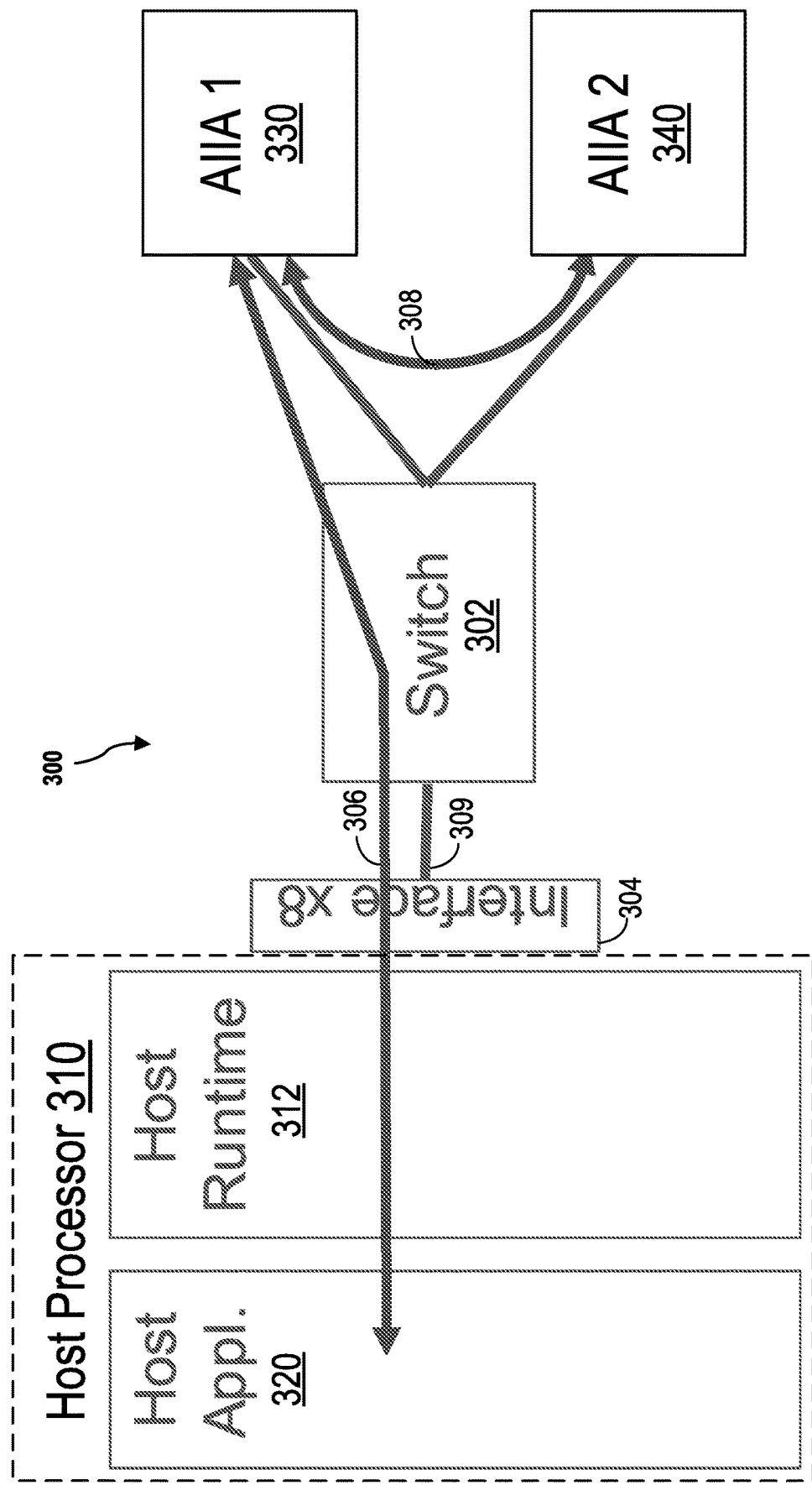
FIG. 3 is a block diagram illustrating a neural network acceleration architecture, in accordance with aspects of the present disclosure.

FIG. 3 is a block diagram illustrating a neural network acceleration architecture 300, in accordance with aspects of the present disclosure. The neural network acceleration architecture 300 includes a first AI inference accelerator (e.g., first AIIA 330), a second AI inference accelerator (e.g., second AIIA 340), and a host processor 310. In this configuration, the host processor 310 includes a host runtime block 312 to execute a host application 320 to operate a neural network. In this example, the neural network of the host application 320 exceeds a fixed amount of memory provided by a single AI inference accelerator (AIIA).

According to this aspect of the present disclosure, the neural network of the host application 320 is split across the first AIIA 330 and the second AIIA 340. That is, the neural network of the host application 320 is hosted in the first AIIA 330 and the second AIIA 340. Splitting of the neural network of the host application 320 between the first AIIA 330 and the second AIIA 340, however, involves routing of intermediate inference request results 308 generated by the first AIIA 330 and/or the second AIIA 340. In this example, the intermediate inference request results 308 are routed between the first AIIA 330 and the second AIIA 340 independent of the host processor 310. As should be recognized, the intermediate inference request results 308 are intermediate results to generate an inference request result 306.

The inference request result 306 is provided to the host processor 310 through a designated inference accelerator of the first AIIA 330 and the second AIIA 340. In this configuration, a non-designated inference accelerator (e.g., the second AIIA 340) communicates with the host processor 310 via the designated inference accelerator (e.g., the first AIIA 330). For example, the inference request result 306 may be generated by the first AIIA 330, in which the inference request result 306 is based on the intermediate inference request results 308 received from the second AIIA 340.

In one aspect of the present disclosure, the routing of the intermediate inference request results 308 is based on an address implementation applied by a switch device 302, including a peripheral interface 304 (e.g., an x8 peripheral interface). In this configuration, the switch device 302 (e.g., a peripheral component interconnect express (PCIe) switch) is coupled to the first AIIA 330 and the second AIIA 340 through a peripheral interconnect 309. The switch device 302 is coupled to the host processor 310 via the peripheral interface 304 (e.g., a PCIe x8 interface).

According to this aspect of the present disclosure, the switch device 302 supports peer-to-peer communication between the first AIIA 330 and the second AIIA 340 to enable direct memory access (DMA) transfer without intervention from the host processor 310. In one configuration, the switch device 302 (e.g., a PCIe switch) is configured to route based on an address range. For example, a peer-to-peer address range is set up for which the data is transferred by the switch device 302 in a peer-to-peer manner. In this configuration, inbound address translation units (iATUs) in the first AIIA 330 and the second AIIA 340 are set to map the local addresses to the peer-to-peer address space (e.g., a PCIe address space of the switch device 302). This switching is transparent to, for example, an endpoint in the first AIIA 330 and/or the second AIIA 340. DMA transfers are set up with the appropriate addresses that target locations in the peer device. In addition, base address registers (BARs) in the first AIIA 330 and/or the second AIIA 340 may provide an access window to peer AIIAs, such as the first AIIA 330 and/or the second AIIA 340.

For example, the switch device 302 supports mapping of local addresses of the first AIIA 330 and the second AIIA 340 to exchange the intermediate inference request results 308 without intervention from the host processor 310. In some aspects, data from the host processor 310 may be accessed by the first AIIA 330 based on the noted DMA implementation. Similarly, data from the first AIIA 330 may be accessed by the second AIIA 340 based on the noted DMA implementation, as further illustrated in FIG. 4.

Figure 4:
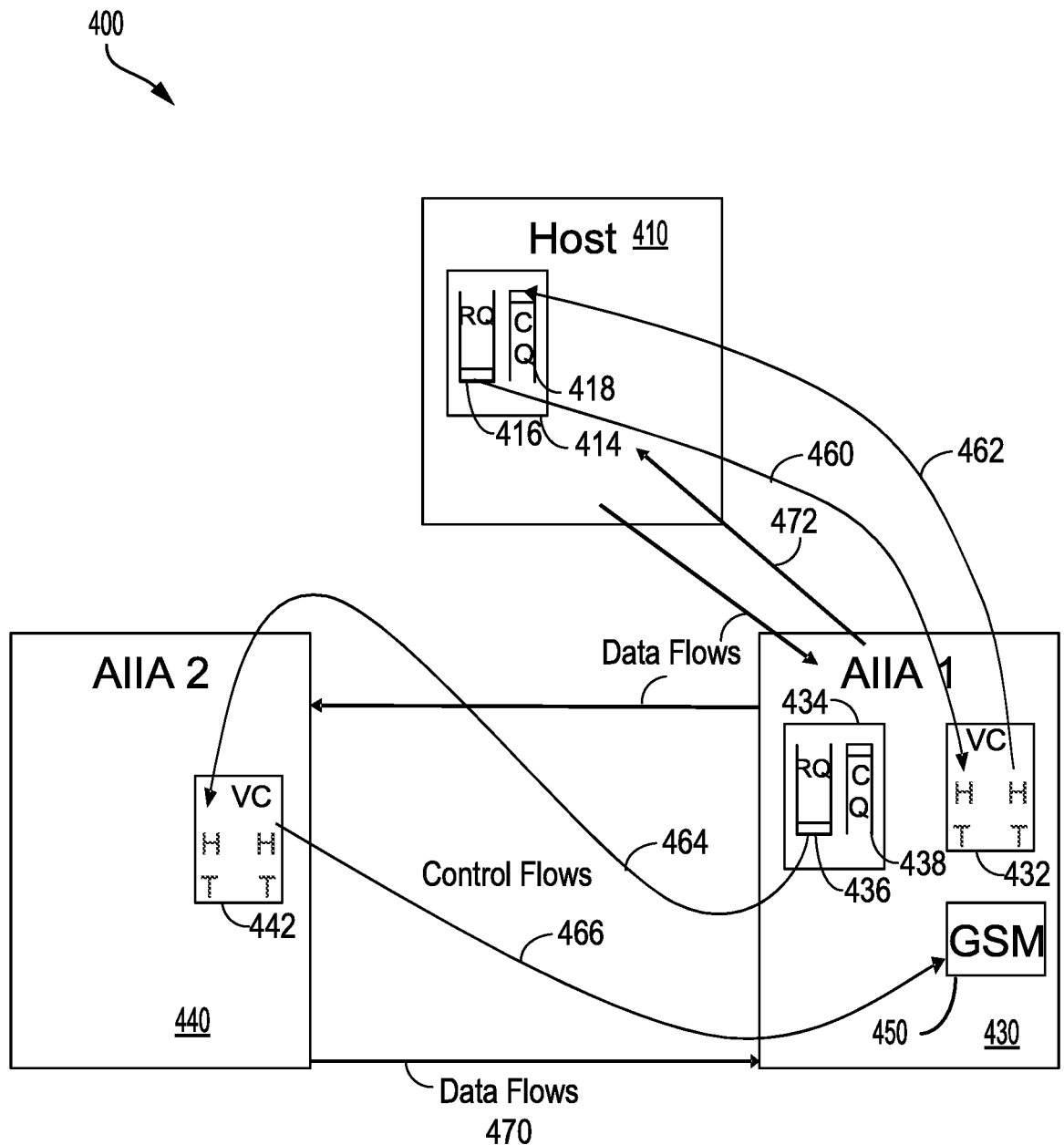
FIG. 4 is a block diagram illustrating control flow and data flow in a neural network acceleration architecture, in accordance with aspects of the present disclosure.

FIG. 4 is a block diagram illustrating control flow and data flow in a neural network acceleration architecture, in accordance with aspects of the present disclosure. In this configuration, a neural network acceleration architecture 400 may be similar to the neural network acceleration architecture 300 shown in FIG. 3. In this example, data accessed by a first AIIA 430 may be through a pointer stored in a request queue (RQ) 416 in a memory 414 of a host 410 (e.g., a host processor). Inference inputs (e.g., pointers) are queued in the RQ 416. When it is determined that pointers to data exists in the RQ 416, the data is transferred and received at a virtual channel (e.g., VC 432) of the first AIIA 430, as shown by a first control flow 460. In addition, an inference request result is provided to a completion queue (QC) 418 of the host 410 from the first AIIA 430, as shown by a second control flow 462.

As further illustrated in FIG. 4, a second AIIA 440 also includes a virtual channel (e.g., VC 442) through which data is received by the second AIIA 440, as shown by a third control flow 464, and transmitted by the second AIIA 440, as shown by a fourth control flow 466. One way to communicate the inference request result from the first AIIA 430 to the host 410 is through a global synchronization manager (GSM) 450 of the first AIIA 430. The first AIIA 430 may also include a request queue (RQ) 436 and a completion queue (CQ) 438 in a memory 434 of the first AIIA 430.

According to this configuration, the host 410 is the driver for control flows and data flows of the first AIIA 430 using the RQ 416 and the CQ 418 in the memory 414 of the host 410. Similarly, the first AIIA 430 is the driver for control flows and data flows of the second AIIA 440 using the RQ 436 and the CQ 438 in the memory 434 of the first AIIA 430. For example, a network signal processor (NSP) (not shown) of the first AIIA 430 generates an RQ element in the RQ 436 within the memory 434 of the first AIIA 430 for DMA of inputs to the second AIIA 440.

In this example, the NSP of the first AIIA 430 generates an additional RQ element in the RQ 436 for DMA of results from the second AIIA 440 (see data flow 470). The additional RQ element may have a final DMA (e.g., a doorbell) that can write to a sync manager (e.g., GSM 450) in the first AIIA 430. Writing to the GSM 450 may be performed by the second AIIA 440 using an interconnect protocol (e.g., a peripheral component interconnect (PCI) protocol), as shown by the fourth control flow 466. An RQ tail (T) pointer is incremented in the VC 442 of the second AIIA 440 using, for example, the third control flow 464.

In this configuration, operation of the second AIIA 440 assumes communication with the host 410; however, a host address for this communication is mapped to the first AIIA 430. Once intermediate results are completed by the second AIIA 440, a doorbell to the GSM 450 in first AIIA 430 is written across the switch device 302, as shown in FIG. 3. A DMA channel established in the first AIIA 430 may be assigned a pre-synchronization condition to DMA an inference request result back to the host 410, as shown by a data flow 472.

Figure 5:
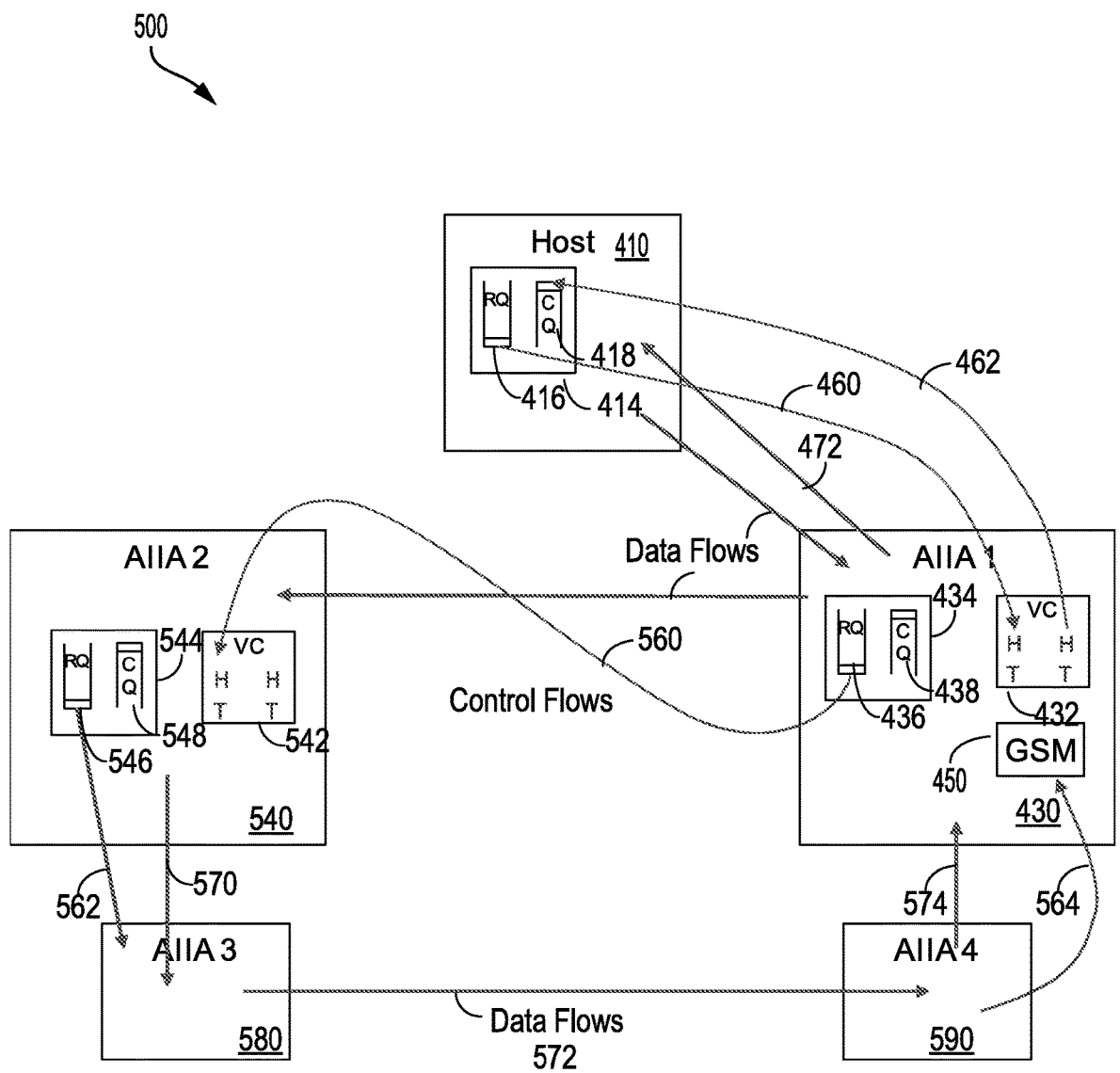
FIG. 5 is a block diagram illustrating control flow and data flow in a neural network acceleration architecture, in accordance with aspects of the present disclosure.

FIG. 5 is a block diagram illustrating control flow and data flow in a neural network acceleration architecture, in accordance with aspects of the present disclosure. In this configuration, a network acceleration architecture 500 may be similar to the neural network acceleration architecture 400 shown in FIG. 4, including the host 410 and the first AIIA 430. In this configuration, a second AIIA 540 includes a virtual channel (e.g., VC 542) as well as a memory 544, including a request queue (e.g., RQ 546) and a command queue (CQ) 548. The network acceleration architecture 500 further includes a third AIIA 580 and a fourth AIIA 590.

In operation, data accessed by the second AIIA 540 may come from the RQ 436 in the memory 434 of the first AIIA 430. Inference inputs are queued in the RQ 436. When it is determined that data exists in the RQ 436, the data is transferred and received at the VC 542 of the second AIIA 540, as shown by a control flow 560. In addition, data accessed by the third AIIA 580 may come from the RQ 546 in the memory 544 of the second AIIA 540. Inference inputs are queued in the RQ 546. When it is determined that data exists in the RQ 546, the data is transferred and received at the third AIIA 580, as shown by a control flow 562. When an intermediate inference request result is stored in the completion queue CQ 548 of the second AIIA 540, the intermediate inference request result is passed from the second AIIA 540 to the third AIIA 580, as shown by a data flow 570.

Once intermediate results are completed by the third AIIA 580, the intermediate inference request results are written to the fourth AIIA 590. Once intermediate results are completed by the fourth AIIA 590, the fourth AIIA 590 may use a doorbell mechanism to the GSM 450 in the first AIIA 430, such that the intermediate results are written across the switch device 302 (FIG. 3), as shown by a data flow 574. A DMA channel established in the first AIIA 430 may be assigned a pre-synchronization condition to DMA an inference request result back to the host 410, as shown by the data flow 472. The configuration of the network acceleration architecture 500 includes additional computing power provided by the addition of the third AIIA 580 and the fourth AIIA 590. Unfortunately, a circular data movement shown by data flows 570, 572, and 574 to provide the inference request result to the first AIIA 430 involves an extra data transfer, as shown by the data flow 574.

Figure 6:
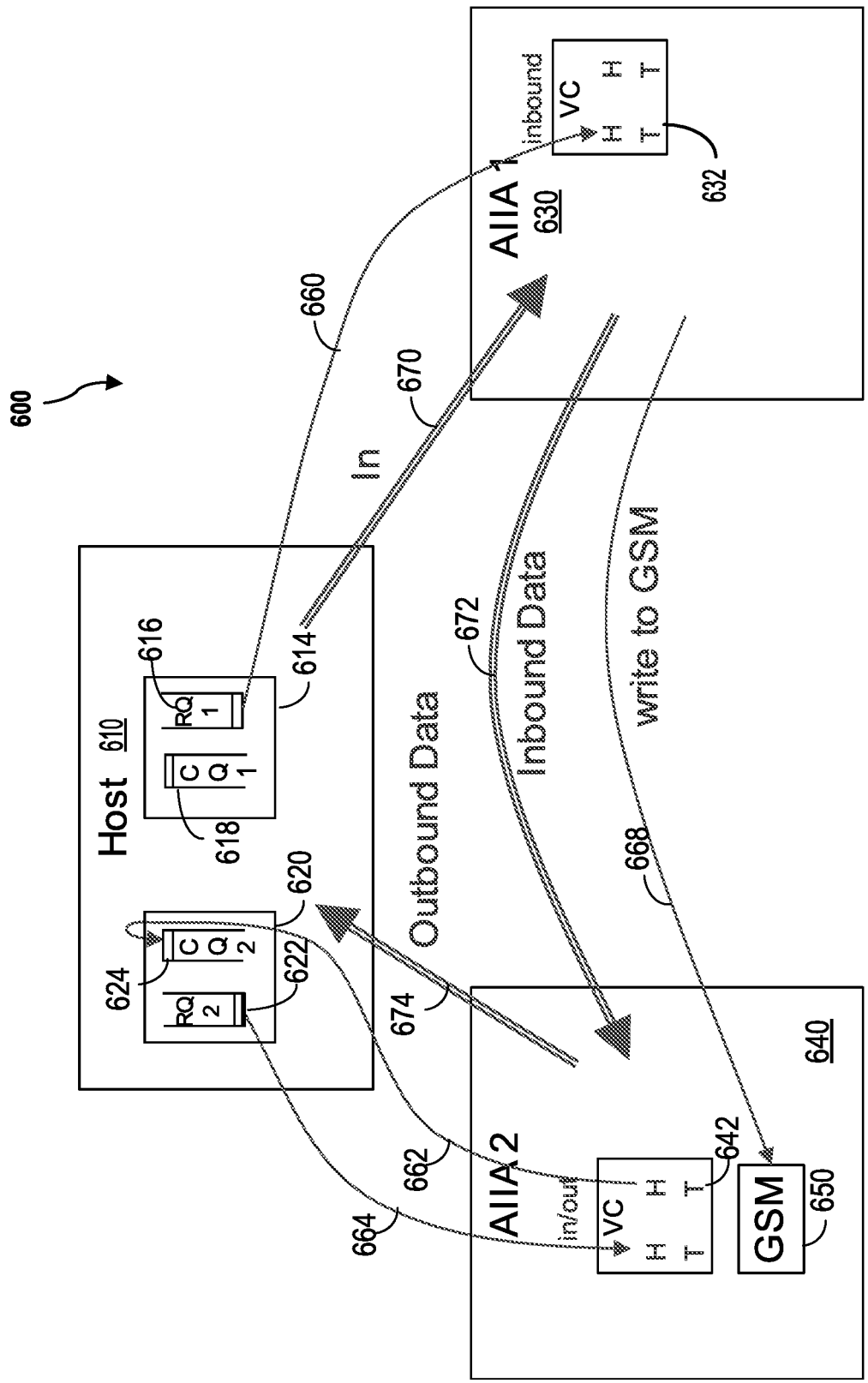
FIG. 6 is a block diagram illustrating control flow and data flow in a neural network acceleration architecture, in accordance with further aspects of the present disclosure.

FIG. 6 is a block diagram illustrating control flow and data flow in a neural network acceleration architecture, in accordance with aspects of the present disclosure. In one configuration, a network acceleration architecture 600 may be similar to the neural network acceleration architecture 400 shown in FIG. 4. In one configuration, the network acceleration architecture 600 includes a host 610, a first AIIA 630, and a second AIIA 640. In this configuration, the host 610 controls both the first AIIA 630 and the second AIIA 640, which eliminates an extra data transfer relative to the neural network acceleration architecture 400 shown in FIG. 4. The network acceleration architecture 600, however, involves an additional cost for having a host interface with the first AIIA 630 and a host interface with the second AIIA 640.

In this aspect of the present disclosure, the first AIIA 630 includes a first request queue (RQ1) 616 and a first complete queue (CQ1) 618 in a first host memory 614. In this configuration, the host 610 is the driver (see control flow 660) for an input data transfer 670 (In) from the host 610 to the first AIIA 630. In addition, the first AIIA 630 includes a virtual channel (VC) 632 for the input data transfer 670, including head (H) and tail (T) pointers to organize the input data transfer 670 to generate an intermediate inference request result for the first part of the neural network.

In this configuration, the second AIIA 640 includes a second request queue (RQ2) 622 and a second complete queue (CQ2) 624 in a second host memory 620 for an inbound data transfer 672 from the first AIIA 630 and an outbound data transfer 674 to the host 610. In addition, the second AIIA 640 includes a virtual channel (VC) 642 for the inbound data transfer 672 and the outbound data transfer 674, including head (H) and tail (T) pointers to organize the inbound data transfer 672 and the outbound data transfer 674 to generate an intermediate inference request result for a second part of the neural network. In this configuration, the host 610 is the driver for the inbound data transfer 672, in which data movement is from the first AIIA 630 to the second AIIA 640. In addition, the host 610 may be configured to complete a final inference request result based on the intermediate inference request result for the part of the neural network, computed by the first AIIA 630 and the intermediate inference request result for the second part of the neural network, computed by the second AIIA 640.

In operation, for a single inference request, the host 610 is specified to place an inbound request in a first request queue RQ1 616 for the inputs to compute the single inference request. In addition, the host 610 is further configured to place an inbound request in the second request queue RQ2 622 for the transfer of intermediate inference request results from the first AIIA 630 to the second AIIA 640. The host 610 is also configured to place an outbound request in the second request RQ2 622 for the inference request results. Transfer of the intermediate inference request results is performed after the first AIIA 630 completes inference of a first half of a neural network.

In this aspect of the present disclosure, once the inference for the first half of the neural network is completed, the first AIIA 630 may write a value to a semaphore in the second AIIA 640 (e.g., greater than the stored value by one (1)); however, the first AIIA 630 may not know a value of the semaphore in the second AIIA 640. The first AIIA 630 may increment a semaphore in the second AIIA 640 by writing across a switch device (not shown) to a GSM 650 in the second AIIA 640, as shown by a control flow 668. In this configuration, the second AIIA 640 performs a pre-synchronization condition when the semaphore reaches a predetermined value. For example, the second AIIA 640 initiates a DMA transfer to move data according to a request queue element (RQE) in the second request RQ2 622, as shown by the outbound data transfer 674. In this configuration, the second AIIA 640 writes to a doorbell register of a network signal processor (NSP) memory (e.g., according to RQE) to notify the NSP that processing of the intermediate results can begin in the second half of the network. The notification to the host 610 of completion of the final inference request result is performed by placing an entry in the second command queue (CQ2) 624 and incrementing a CQ2 tail pointer, as shown by control flows 662 and 664.

Figure 7:
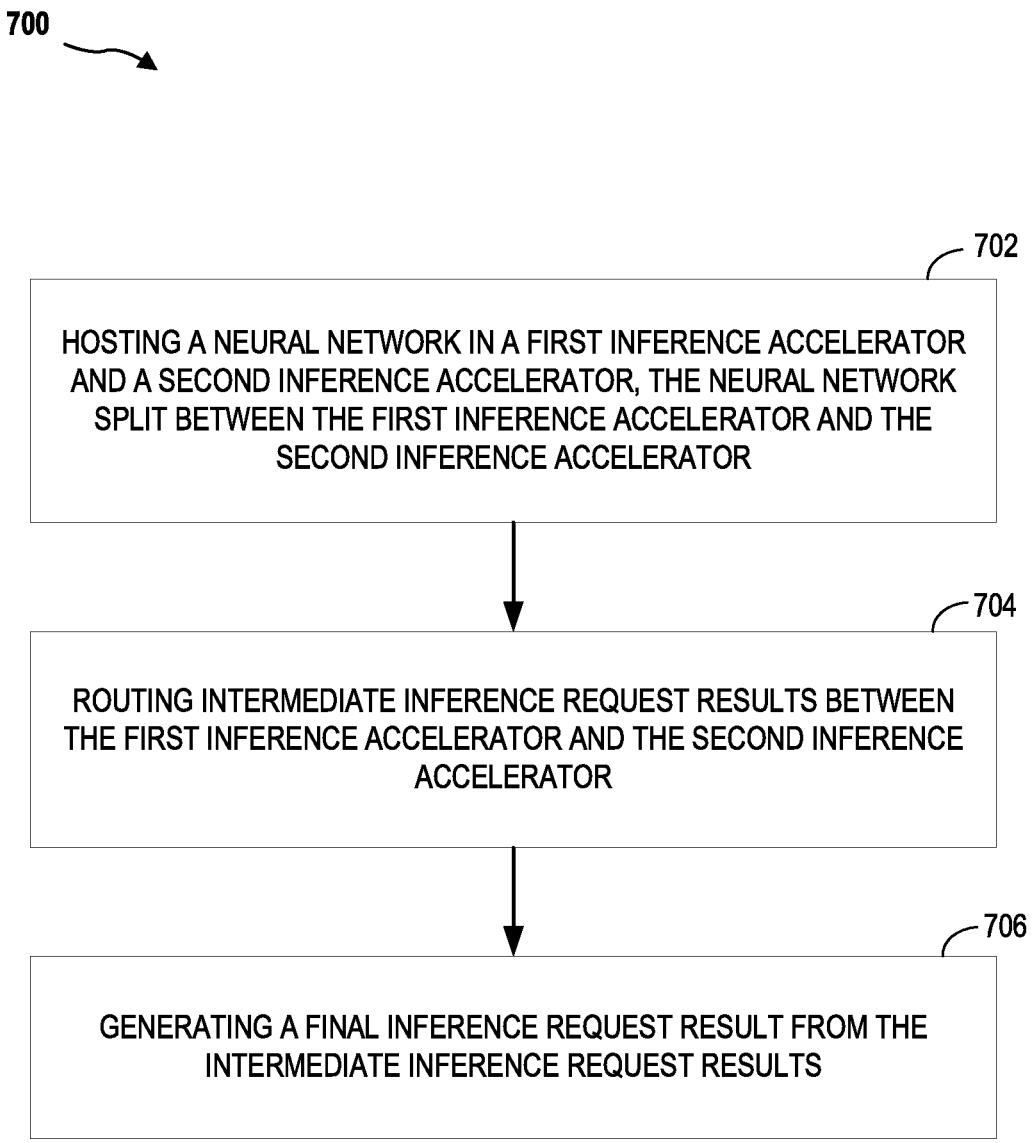
FIG. 7 illustrates a method for accelerating machine learning on a computing device, in accordance with aspects of the present disclosure.

FIG. 7 illustrates a method for accelerating machine learning on a computing device. A method 700 begins in block 702, in which a neural network is hosted in a first inference accelerator and a second inference accelerator. For example, as shown in FIG. 4, a neural network is split between the first AIIA 430 and the second AIIA 440. The method continues in block 704, where intermediate inference request results are routed between the first inference accelerator and the second inference accelerator. For example, as shown in FIG. 4, the data flows between the first AIIA 430 and the second AIIA 440 are routed independently of the host 410 (e.g., a host processor of a computing device). At block 706, a final inference request result is generated from the intermediate inference request results. For example, in FIG. 4, the final inference request result is generated by the second AIIA 440 based on the intermediate inference request results from the first AIIA 430. In some aspects, the method 700 may be performed by a system-on-chip (SoC) that includes the two separate inference accelerators.

In some aspects, the method 700 may be performed by the SOC 100 (FIG. 1). That is, each of the elements of the method 700 may, for example, but without limitation, be performed by the SOC 100 or one or more processors (e.g., CPU 102 and/or NPU 108) and/or other components included therein.

The system for accelerating machine learning includes means for routing intermediate inference request results directly between a first inference accelerator and a second inference accelerator. In one aspect, the routing means may be the switch device 302 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for accelerating machine learning on a computing device comprising a first inference accelerator, a second inference accelerator, and a host processor, the method comprising:
 implementing, in memory of the host processor, a first request queue associated with the first inference accelerator, the first request queue receiving a pointer to inference data received at the host processor, the inference data being transmitted from the host processor, via a virtual channel, to the first inference accelerator for processing in response to the first request queue receiving the pointer;
 implementing, in the memory of the host processor, a completion queue for receiving a final inference request result, via a first direct memory access (DMA) transfer, in response to transmitting the inference data;
 hosting a neural network in the first inference accelerator and the second inference accelerator, the neural network split between the first inference accelerator and the second inference accelerator;
 routing intermediate inference request results directly between the first inference accelerator and the second inference accelerator, the routing of the intermediate interface request results being performed independently of the host processor;
 generating a final inference request result from the intermediate inference request results; and
 implementing, in the first inference accelerator or the second inference accelerator, a global synchronization manager (GSM) to route the final inference request result to the host processor, via the first DMA transfer, in accordance with satisfying a pre-synchronization condition.

2. The method of claim 1, in which generating the final inference request result comprises generating the final inference request result by the second inference accelerator in response to the intermediate inference request results from the first inference accelerator.

3. The method of claim 2, in which:
 the second inference accelerator includes the GSM;
 the method further comprises transmitting the final inference request result via the GSM of the second inference accelerator directly to the host processor; and
 the pre-synchronization condition is satisfied based on a semaphore stored in the second inference accelerator reaching a predetermined value.

4. The method of claim 2, further comprising transmitting the final inference request result from the second inference accelerator to the host processor via the first inference accelerator.

5. The method of claim 1, further comprising implementing a request queue for the second inference accelerator in memory of the first inference accelerator.

6. The method of claim 1, further comprising implementing a request queue for the second inference accelerator in memory of the host processor.

7. The method of claim 1, in which:
 the first inference accelerator includes the GSM;
 generating the final inference request result further comprises notifying, by the second inference accelerator via a doorbell operation, the GSM of a second DMA transfer of the final inference request result from the second inference accelerator to the first inference accelerator; and
 the pre-synchronization condition is satisfied based on receiving the notification via the doorbell operation.

8. The method of claim 7, in which the second DMA transfer of the final inference request result from the second inference accelerator to the first inference accelerator is based on a request queue element in a request queue of the second inference accelerator stored in memory of the first inference accelerator.

9. The method of claim 1, in which:
 the second inference accelerator includes the GSM; and
 routing the intermediate inference request results comprises writing, by the first inference accelerator, across a switch device to the GSM of the second inference accelerator after a second DMA transfer of the intermediate inference request results from the first inference accelerator to the second inference accelerator.

10. The method of claim 1, further comprising mapping, at the second inference accelerator, an address of the host processor to the first inference accelerator.

11. A system for accelerating machine learning, comprising:
 a first inference accelerator and a second inference accelerator to host a neural network, the neural network split between the first inference accelerator and the second inference accelerator;
 a host processor to receive inference data and a final inference request result, the final inference request result being generated from intermediate inference request results, the host processor including:
  a first request queue associated with the first inference accelerator, the first request queue receiving a pointer to the inference data, the inference data being transmitted from the host processor, via a virtual channel, to the first inference accelerator for processing in response to the first request queue receiving the pointer, and
  a completion queue for receiving a final inference request result, via a first direct memory access (DMA) transfer, in response to transmitting the inference data;
 a switch to route the intermediate inference request results directly between the first inference accelerator and the second inference accelerator, the routing of the intermediate interface request results being performed independently of the host processor; and
 a global synchronization manager (GSM), included in the first inference accelerator or the second inference accelerator, to route the final inference request result to the host processor, via the first DMA transfer, in accordance with satisfying a pre-synchronization condition.

12. The system of claim 11, in which the final inference request result is generated by the second inference accelerator in response to the intermediate inference request results from the first inference accelerator.

13. The system of claim 12, in which:
 the second inference accelerator includes the GSM;
 the final inference request result is transmitted from the GSM of the second inference accelerator directly to the host processor; and
 the pre-synchronization condition is satisfied based on a semaphore stored in the second inference accelerator reaching a predetermined value.

14. The system of claim 12, in which:
 the first inference accelerator includes the GSM; and
 the final inference request result is transmitted from the second inference accelerator to the host processor via the first inference accelerator.

15. The system of claim 11, in which:
the first inference accelerator includes the GSM;
the GSM notifies the first inference accelerator of a second DMA transfer of the final inference request result from the second inference accelerator to the first inference accelerator in response to the GSM receiving, from the second inference accelerator via a doorbell operation, a notification of the second DMA transfer; and
the pre-synchronization condition is satisfied based on the GSM receiving the notification via the doorbell operation.

16. The system of claim 11, in which:
the second inference accelerator includes the GSM;
the GSM notifies the second inference accelerator after a second DMA transfer of the intermediate inference request results from the first inference accelerator to the second inference accelerator.

17. A system for accelerating machine learning, comprising:
a first inference accelerator and a second inference accelerator to host a neural network, the neural network split between the first inference accelerator and the second inference accelerator;
a host processor to receive inference data and a final inference request result, the final inference request result being generated from intermediate inference request results, the host processor including:
a first request queue associated with the first inference accelerator, the first request queue receiving a pointer to the inference data, the inference data being transmitted from the host processor, via a virtual channel, to the first inference accelerator for processing in response to the first request queue receiving the pointer, and
a completion queue for receiving a final inference request result, via a first direct memory access (DMA) transfer, in response to transmitting the inference data;
means for routing the intermediate inference request results directly between the first inference accelerator and the second inference accelerator, the routing of the intermediate interface request results being performed independently of the host processor; and
means for transmitting, the final inference request result to the host processor, via the first DMA transfer, the transmission being initiated by a global synchronization manager (GSM) included in the first inference accelerator or the second inference accelerator in accordance with satisfying a pre-synchronization condition.

18. The system of claim 17, in which the final inference request result is generated by the second inference accelerator in response to the intermediate inference request results from the first inference accelerator.

19. The system of claim 18, in which:
the second inference accelerator includes the GSM;
the final inference request result is transmitted from the second inference accelerator directly to the host processor; and
the pre-synchronization condition is satisfied based on a semaphore stored in the second inference accelerator reaching a predetermined value.

20. The system of claim 18, in which:
the first inference accelerator includes the GSM;
the final inference request result is transmitted from the second inference accelerator to the host processor via the first inference accelerator based on the GSM receiving a notification, from the second inference accelerator via a doorbell operation, of a second DMA transfer of the of the final inference request result from the second inference accelerator to the first inference accelerator; and
the pre-synchronization condition is satisfied based on receiving the notification via the doorbell operation.

\* \* \* \* \*